(12) United States Patent  
Matsumoto

(10) Patent No.: US 10,714,126 B2  
(45) Date of Patent: Jul. 14, 2020

(54) MAGNETIC RECORDING HEAD AND DISK DEVICE INCLUDING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuya Matsumoto, Shinagawa Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/284,205

(22) Filed: Feb. 25, 2019

(65) Prior Publication Data

US 2019/0355386 A1 Nov. 21, 2019

(30) Foreign Application Priority Data

May 15, 2018 (JP) .................... 2018-093855

(51) Int. Cl.
*G11B 5/127* (2006.01)
*G11B 5/012* (2006.01)
*G11B 5/31* (2006.01)

(52) U.S. Cl.
CPC ............ *G11B 5/1278* (2013.01); *G11B 5/012* (2013.01); *G11B 5/3146* (2013.01)

(58) Field of Classification Search
CPC ...... G11B 5/1278; G11B 5/3146; G11B 5/012
See application file for complete search history.

(56) References Cited

U.S. PATENT DOCUMENTS

| 7,616,412 | B2 * | 11/2009 | Zhu ................ | B82Y 10/00 360/324.2 |
| 8,159,781 | B2 * | 4/2012 | Taguchi ............ | G11B 5/3133 360/125.12 |
| 8,553,362 | B2 | 10/2013 | Tanabe et al. | |
| 8,654,480 | B2 * | 2/2014 | Shimizu ............ | G11B 5/314 360/128 |
| 8,705,206 | B1 * | 4/2014 | Maeda .............. | G11B 5/23 360/119.04 |
| 8,810,946 | B2 | 8/2014 | Yasui et al. | |

(Continued)

*Primary Examiner* — Brian E Miller  
(74) *Attorney, Agent, or Firm* — Kim & Stewart LLP

(57) ABSTRACT

A magnetic recording head includes a slider having an air bearing surface, a main magnetic pole including a fore-end portion that extends towards the air bearing surface and configured to generate recording magnetic fields in a first direction, a write shield magnetic pole located across from the fore-end portion to form a write gap that extends therebetween in a second direction and forming a magnetic core in conjunction with the main magnetic pole, a coil configured to excite a magnetic flux in the magnetic core, first and second spin-torque oscillators in the write gap and arranged along a third direction with a spacing therebetween, and a current circuit connected to the first and second spin-torque oscillators via the main magnetic pole and the write shield magnetic pole and configured to supply current to oscillate the first or second spin-torque oscillators.

14 Claims, 10 Drawing Sheets

(56) References Cited

U.S. PATENT DOCUMENTS

| | | | | |
|---|---|---|---|---|
| 8,837,086 B2* | 9/2014 | Udo | ............... | G11B 5/1278 |
| | | | | 360/125.3 |
| 8,848,317 B2 | 9/2014 | Shiimoto et al. | | |
| 8,937,789 B2* | 1/2015 | Watanabe | ............... | G11B 5/314 |
| | | | | 360/122 |
| 8,964,332 B1* | 2/2015 | Katada | ............... | G11B 5/56 |
| | | | | 360/125.3 |
| 9,099,102 B2 | 8/2015 | Katada et al. | | |
| 9,123,361 B1* | 9/2015 | Kief | ............... | G11B 5/265 |
| 10,210,888 B1* | 2/2019 | Li | ............... | G11B 5/3116 |
| 2011/0242701 A1* | 10/2011 | Ohtake | ............... | B82Y 10/00 |
| | | | | 360/99.08 |
| 2012/0120518 A1* | 5/2012 | Matsubara | ............... | G11B 5/3146 |
| | | | | 360/55 |
| 2013/0250456 A1* | 9/2013 | Yamada | ............... | G11B 5/1278 |
| | | | | 360/245.3 |

* cited by examiner

PRIOR ART

MAGNETIC RECORDING HEAD AND DISK DEVICE INCLUDING THE SAME

CROSS-REFERENCE TO RELATED APPLICATION

This application is based upon and claims the benefit of priority from Japanese Patent Application No. 2018-093855, filed May 15, 2018, the entire contents of which are incorporated herein by reference.

FIELD

Embodiments described herein relate generally to a magnetic recording head and a disk device including the same.

BACKGROUND

In recent years, to increase recording density and capacity of a disk device or decrease the size thereof, perpendicular magnetic recording mechanisms have been proposed. A recording head having such a mechanism includes a main magnetic pole, which generates a perpendicular direction magnetic field, a write shield magnetic pole, which is located on a trailing side of the main magnetic pole across a write gap, and a coil, which causes a magnetic flux to flow through the main magnetic pole. Additionally, a high-frequency assisted head has been proposed, which includes a high-frequency oscillator, such as a spin-torque oscillator, in the write gap between the write shield magnetic pole and the main magnetic pole, and allows electric current to flow to the spin-torque oscillator via the main magnetic pole and the write shield magnetic pole.

Moreover, a recording head having a plurality of spin-torque oscillators in the write gap has been proposed. Each of the spin-torque oscillators has the same stacked film structure. In such a structure, electric current applied to the film surface causes the spin-torque oscillators to oscillate concurrently. In recent years, to improve recording density, a shingled recording method has been proposed, which sequentially writes recording tracks in an overlapping manner with part of the previously written recording track. As mentioned above, in a recording head including a plurality of spin-torque oscillators, the spin-torque oscillators concurrently oscillate. However, such a recording head is unlikely to be compatible with the shingled recording method.

Moreover, a recording head in which an electrode terminal for energization and a plurality of insulating layers are provided inside each spin-torque oscillator has been proposed. In such a spin-torque oscillator, an interval between a main magnetic pole and a write shield magnetic pole (i.e., a write gap) would become wider due to the electrode terminal and the insulating layers. To improve linear recording density, widening of the write gap is undesirable.

DETAILED DESCRIPTION

Figure 1:
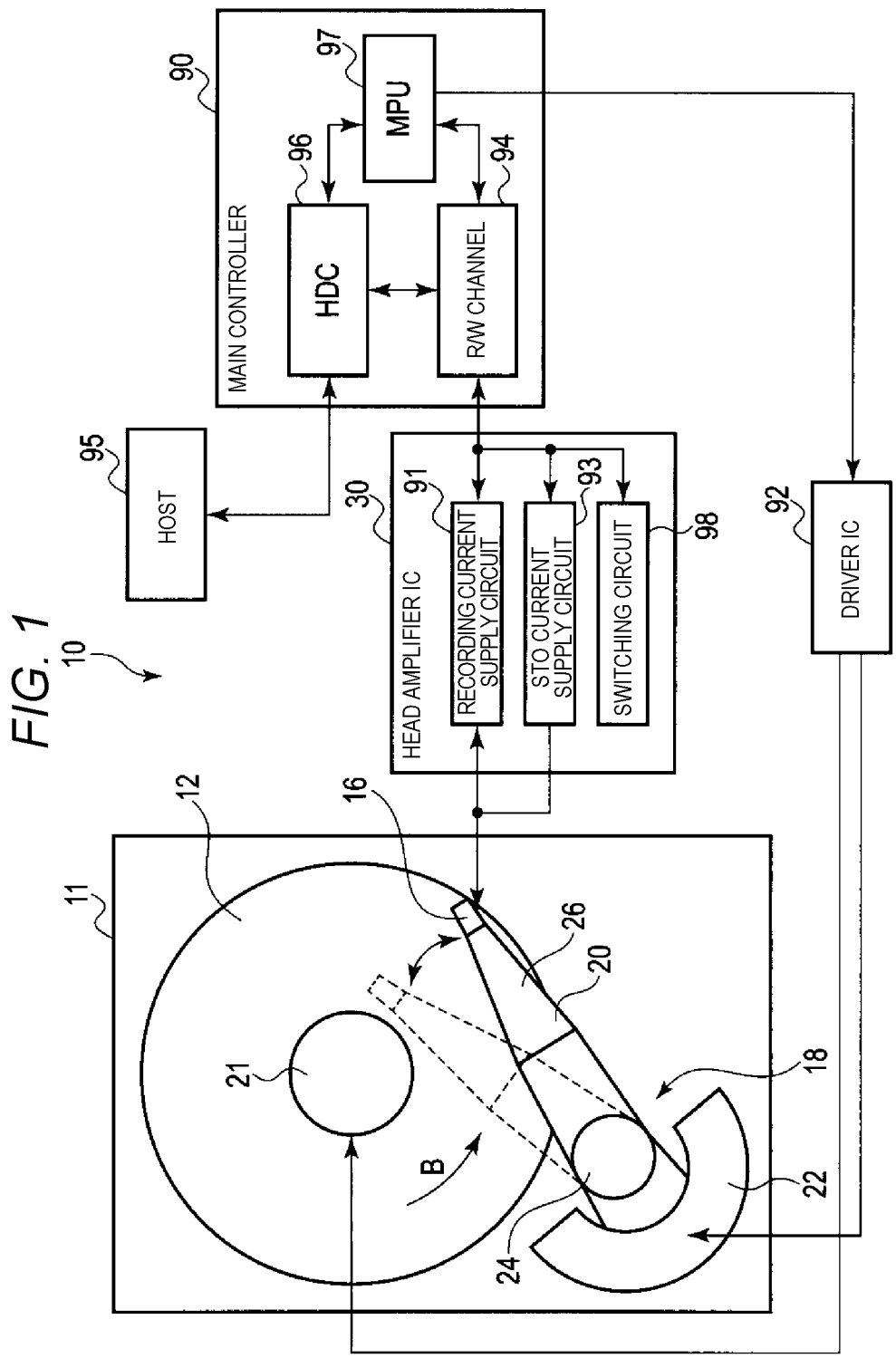
FIG. 1 is a block diagram schematically illustrating a hard disk drive (HDD) according to a first embodiment.

Embodiments provide a magnetic recording head and a disk device including the same which are capable of attaining an improved recording quality.

In general, according to one embodiment, a magnetic recording head comprises a slider having an air bearing surface that faces a surface of a recording medium, a main magnetic pole including a fore-end portion that extends towards the air bearing surface and configured to generate recording magnetic fields in a first direction that is perpendicular to the surface of the recording medium, a write shield magnetic pole located across from the fore-end portion of the main magnetic pole to forma write gap that extends therebetween in a second direction and forming a magnetic core in conjunction with the main magnetic pole, a coil configured to excite a magnetic flux in the magnetic core, first and second spin-torque oscillators in the write gap and arranged along a third direction with a spacing therebetween, wherein the third direction is parallel to the surface of the recording medium and perpendicular to the first direction, an insulating layer inside the write gap between the first and second spin-torque oscillators, and a current circuit electrically connected to the first and second spin-torque oscillators via the main magnetic pole and the write shield magnetic pole and configured to supply current to oscillate one of the first and second spin-torque oscillators.

Hereinafter, disk devices according to embodiments will be described with reference to the drawings.

Furthermore, the disclosure is merely an example, and a configuration which would be obtained by a person skilled in the art modifying the disclosure as appropriate while maintaining the gist of the disclosure and would be able to be readily arrived at should be construed to fall within the scope of the present disclosure. Moreover, the drawings may in some cases be schematically depicted for clarity of illustration with respect to, for example, the width, thickness, and shape of each portion, but are merely examples and are not intended to limit the interpretation of the present disclosure. Furthermore, in the present specification and figures, elements similar to those mentioned earlier with reference to a figure previously referred to are assigned the respective same reference characters, and the detailed description thereof may be omitted or simplified as appropriate.

First Embodiment

As an example of a disk device, a hard disk drive (HDD) according to a first embodiment is described in detail. FIG.

Figure 2:
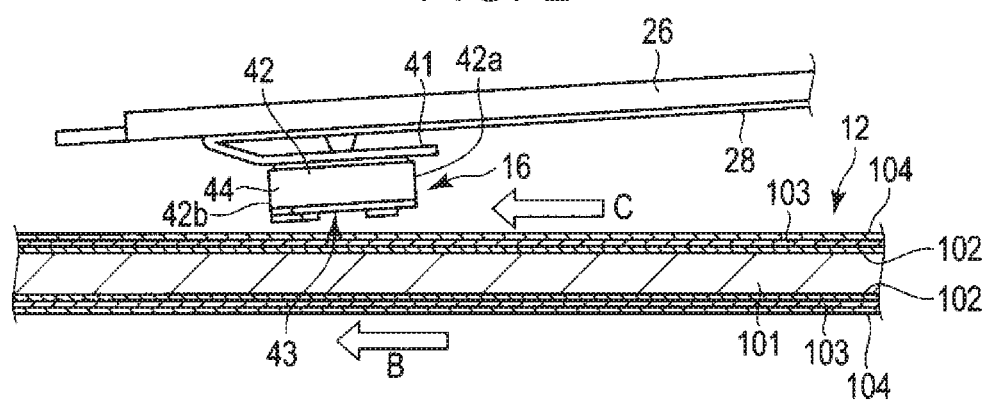
FIG. 2 is a side view illustrating a magnetic head, a suspension, and a magnetic disk in the HDD.

1 is a block diagram schematically illustrating the HDD according to the first embodiment, and FIG. 2 is a side view illustrating a magnetic head, which is in a flying state, and a magnetic disk.

As illustrated in FIG. 1, the HDD 10 includes a chassis 11 of the rectangular shape, a magnetic disk 12 serving as a recording medium, which is mounted inside the chassis 11, a spindle motor 21, which supports and rotates the magnetic disk 12, and a plurality of magnetic heads 16, which performs write of data and read of data with respect to the magnetic disk 12. Moreover, the HDD 10 further includes a head actuator 18, which moves the magnetic heads 16 onto predetermined tracks on the magnetic disk 12 and performs positioning thereof. The head actuator 18 includes a carriage assembly 20, which supports the magnetic heads 16 in a movable manner, and a voice coil motor (VCM) 22, which swivels the carriage assembly 20.

The HDD 10 further includes a head amplifier integrated circuit (IC) 30, which drives the magnetic heads 16, a main controller 90, and a driver IC 92. The head amplifier IC 30 is provided, for example, at the carriage assembly 20 and is electrically connected to the magnetic heads 16. The head amplifier IC 30 includes a recording current supply circuit (recording current supply unit) 91, which supplies recording currents to recording coils of the magnetic heads 16, a spin-torque oscillator (STO) current supply circuit 93, which is used for supplying drive currents to STOs described below, and a switching circuit 98, which switches an energizing direction of the STO current supply circuit 93 to a first direction or a second direction.

The main controller 90 and the driver IC 92 are installed, for example, on a control circuit board (not illustrated) provided on the back side of the chassis 11. The main controller 90 includes a read (R)/write (W) channel 94, a hard disk controller (HDC) 96, and a microprocessor (MPU) 97. The main controller 90 is electrically connected to the magnetic heads 16 via the head amplifier IC 30. The main controller 90 is electrically connected to the VCM 22 and the spindle motor 21 via the driver IC 92. The HDC 96 is connected to a host computer 95.

As illustrated in FIG. 1 and FIG. 2, the magnetic disk 12 is configured as a perpendicular magnetic recording medium. The magnetic disk 12 includes a substrate 101 which is formed, for example, in a disk shape with a diameter of about 2.5 inches (6.35 cm) and is made from a non-magnetic material. On each of the surfaces of the substrate 101, a soft magnetic layer 102, which serves as an under layer and is made from a material having a soft magnetic property, a perpendicular magnetic recording layer 103, which is provided as a layer on top of the under layer and has magnetic anisotropy in a direction perpendicular to the surface of the magnetic disk 12, and a protective film 104 are sequentially stacked in layers. The magnetic disk 12 is fitted on the hub of the spindle motor 21 concentrically with each other. The magnetic disk 12 is configured to be rotated by the spindle motor 21 at a predetermined speed in the direction of arrow B.

The carriage assembly 20 includes a bearing portion 24, which is rotatably fixed to the chassis 11, and a plurality of suspensions 26, which extends from the bearing portion 24. As illustrated in FIG. 2, the magnetic heads 16 are supported by extension ends of the respective suspensions 26. The magnetic heads 16 are electrically connected to the head amplifier IC 30 via wiring members 28 provided at the carriage assembly 20.

As illustrated in FIG. 2, each of the magnetic heads 16 is configured as a flying-type head and includes a slider 42 formed approximately in a rectangular parallelepiped shape and a head portion 44 formed at an end portion on the outflow end side (also referred to as "trailing side") of the slider 42. The slider 42 is formed from, for example, a sintered body of alumina and titanium carbide (AlTiC), and the head portion 44 is formed from a plurality of layers of thin films. The slider 42 is attached to a gimbal portion 41 of the wiring member 28.

The slider 42 has a rectangular disk-facing surface (also referred to as air bearing surface (ABS)) 43, which faces the surface of the magnetic disk 12. The slider 42 is kept in the state of flying a predetermined amount from the surface of the magnetic disk 12 by an air flow C occurring between the disk surface and the ABS 43 due to the rotation of the magnetic disk 12. The direction of the air flow C coincides with the rotation direction B of the magnetic disk 12. The slider 42 includes a leading end 42a situated on the inflow side of the air flow C and a trailing end 42b situated on the outflow side of the air flow C. As the magnetic disk 12 rotates, the magnetic head 16 travels in the direction of arrow D (i.e., head traveling direction) with respect to the magnetic disk 12, in other words, in a direction opposite to the rotation direction B of the magnetic disk 12.

Figure 3:
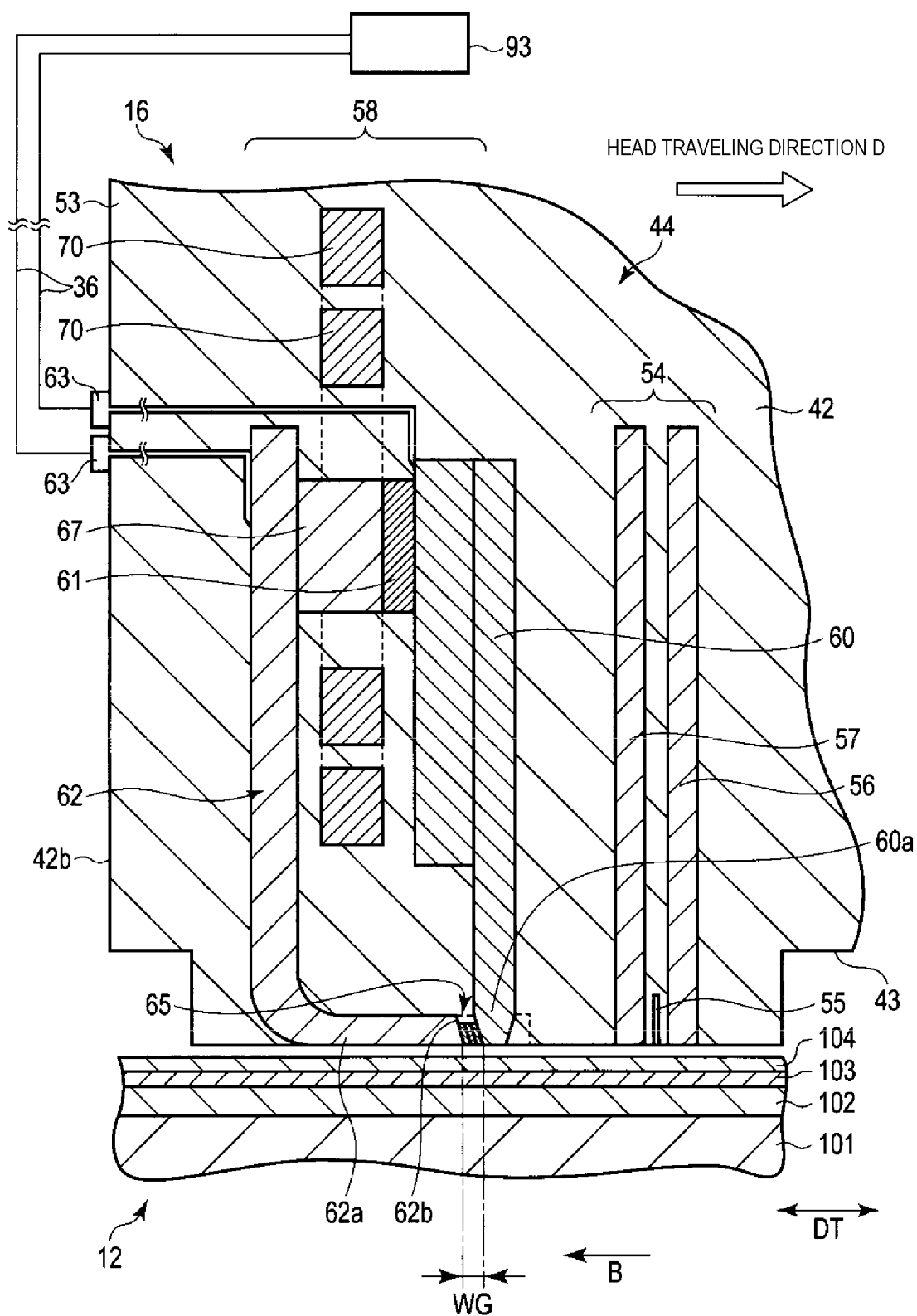
FIG. 3 is a sectional view illustrating, in an enlarged manner, a head portion of the magnetic head.

FIG. 3 is a sectional illustrating the head portion 44 in an enlarged manner. The head portion 44 includes a reproducing head (read head) 54 and a recording head 58, which are formed with a thin-film process at the trailing end 42b of the slider 42, and is formed as a separation-type magnetic head. The reproducing head 54 and the recording head 58, excluding portions thereof exposed on the ABS 43 of the slider 42, are covered with a non-magnetic protective insulating film 53. The protective insulating film 53 makes up the outer shape of the head portion 44.

The reproducing head 54 includes a magnetoresistive effect element 55 and a first magnetic shield film 56 and a second magnetic shield film 57, which are located on the leading side (i.e., inflow side) and the trailing side (i.e., outflow side) of the magnetoresistive effect element 55 along the down-track directions DT in such a way as to sandwich the magnetoresistive effect element 55. The magnetoresistive effect element 55 and the first and second magnetic shield films 56 and 57 extend almost perpendicularly to the ABS 43. The lower ends of the magnetoresistive effect element 55 and the first and second magnetic shield films 56 and 57 are exposed on the ABS 43.

Figure 4:
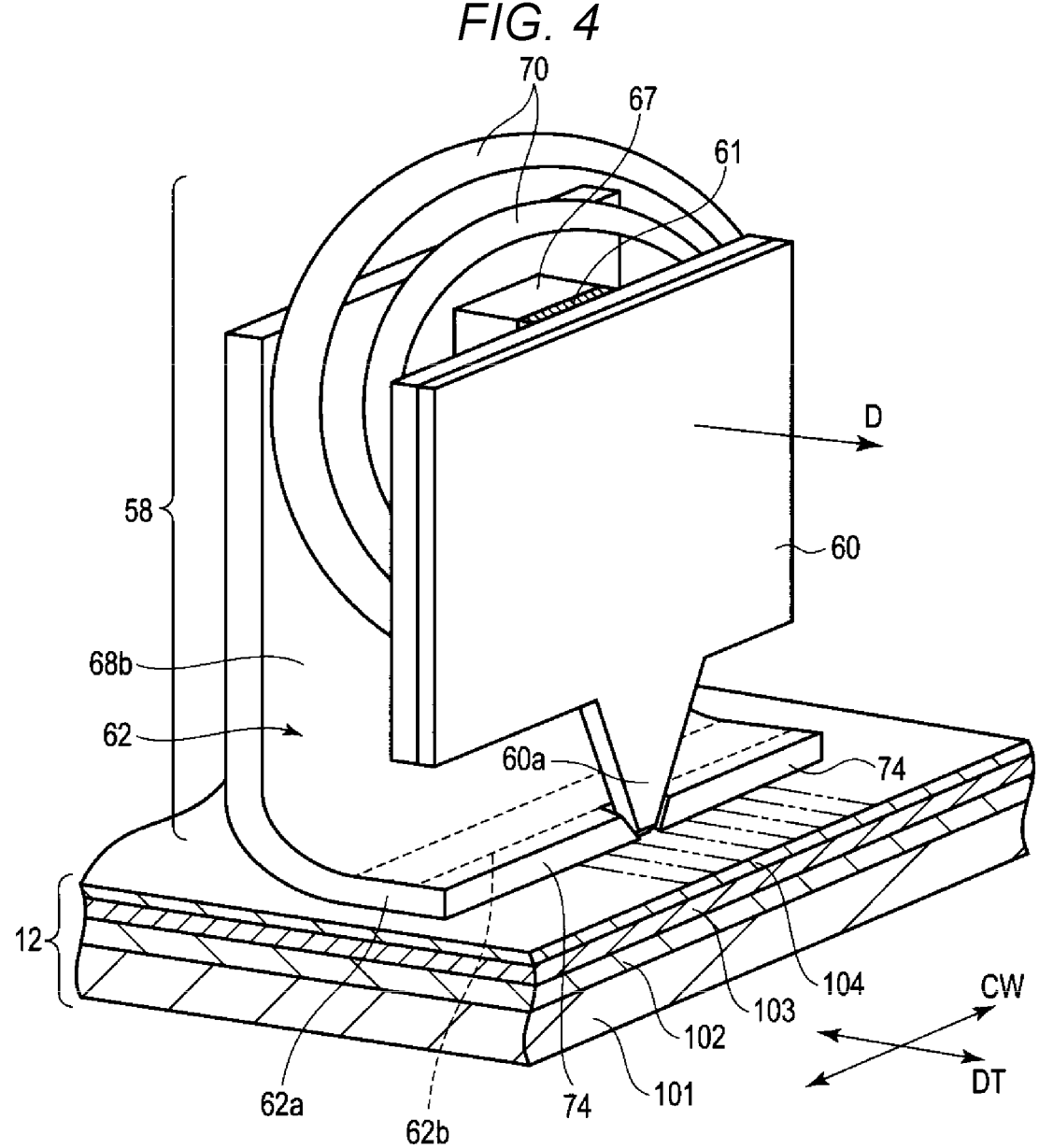
FIG. 4 is a perspective view schematically illustrating a recording head of the magnetic head.
Figure 5:
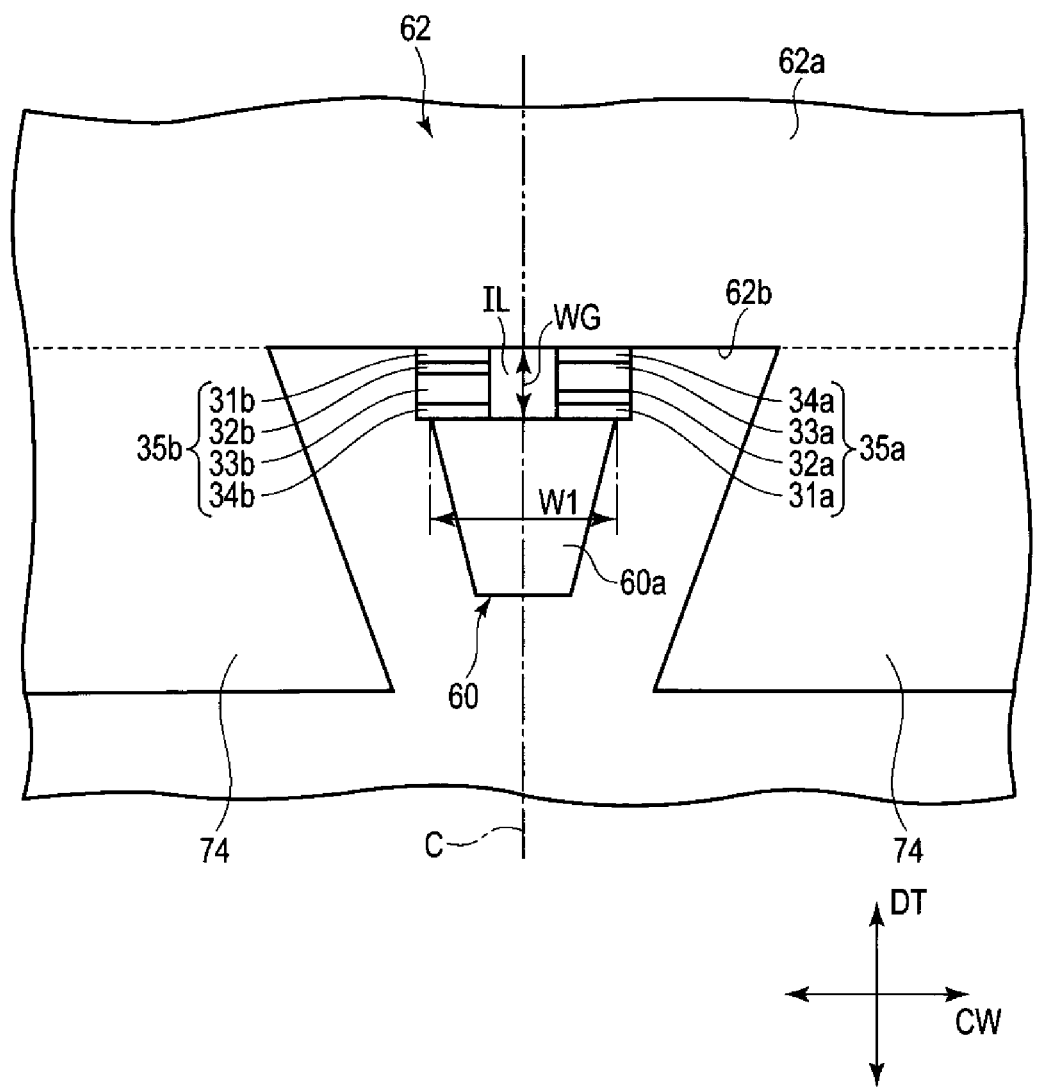
FIG. 5 is a plan view of the recording head of the magnetic head as viewed from the side of an air bearing surface (ABS).

The recording head 58 is provided at the side of the trailing end 42b of the slider 42 with respect to the reproducing head 54. FIG. 4 is a perspective view schematically illustrating the recording head 58 and FIG. 5 is a plan view of the recording head 58 as viewed from the side of the ABS 43. As illustrated in FIG. 3, FIG. 4, and FIG. 5, the recording head 58 includes, for example, a main magnetic pole 60, which generates recording magnetic fields in directions perpendicular to the ABS 43 (i.e., to the magnetic recording layer 103), a write shield magnetic pole (also referred to as trailing shield) 62, which is located opposite to the main magnetic pole 60 across a write gap WG, a junction portion 67, which physically joins the upper portion of the main magnetic pole 60 to the write shield magnetic pole 62, recording coils 70 wound around a magnetic core configured with the main magnetic pole 60 and the write shield magnetic pole 62, and a pair of high-frequency oscillation elements located between the fore-end portion 60a of the main magnetic pole 60 and the write shield magnetic pole 62 while facing the ABS 43, such as first and second spin-torque oscillators 35a and 35b.

The main magnetic pole 60 is formed from a soft magnetic material having high magnetic permeability and high-saturation magnetic flux density, and extends almost perpendicularly to the ABS 43. The fore-end portion 60a, on the side close to the ABS 43, of the main magnetic pole 60 is tapered toward the ABS 43 and the surface of the magnetic disk 12 and is thus formed in a column shape narrower in width than the other portions. The fore-end surface of the main magnetic pole 60 is exposed on the ABS 43 of the slider 42. The width W1 of the fore-end portion 60a (i.e., the width taken along track width directions CW) is formed to be greater than or equal to the width of a recording track on the magnetic disk 12.

The write shield magnetic pole 62 is formed from a soft magnetic material and is provided to efficiently close a magnetic path via a portion of the soft magnetic layer 102 of the magnetic disk 12 located immediately below the main magnetic pole 60. The main magnetic pole 60 and the write shield magnetic pole 62 are located on the long axis of the slider 42 (i.e., central axis C) and side by side along down-track directions DT.

The write shield magnetic pole 62 is formed almost in an L shape, and the fore-end portion 62a thereof is formed in an elongated rectangular shape. The fore-end surface of the write shield magnetic pole 62 is exposed on the ABS 43 of the slider 42. The fore-end portion 62a has a leading-side end surface (magnetic pole end surface) 62b located opposite to the fore-end portion 60a of the main magnetic pole 60. The leading-side end surface 62b is sufficiently longer than the width W1 of the fore-end portion 60a of the main magnetic pole 60 and the track width of the magnetic disk 12, and extends along the track width directions CW of the magnetic disk 12. The leading-side end surface 62b extends while being slightly inclined relative to the ABS 43. In the ABS 43, the lower end edge of the leading-side end surface 62b faces the trailing-side end surface of the main magnetic pole 60 in parallel across the write gap WG (i.e., the gap length along the down-track directions DT).

In the present embodiment, the recording head 58 includes a pair of side shields 74. The side shields 74 are located on both sides of the main magnetic pole 60 in the track width direction in such a way as to be physically separate from the main magnetic pole 60 and to be connected to the write shield magnetic pole 62. In the present embodiment, each of the side shields 74 is formed from a high magnetic permeability material integrally with the fore-end portion 62a of the write shield magnetic pole 62 and is projected from the leading-side end surface 62b of the fore-end portion 62a toward the leading end side of the slider 42.

As illustrated in FIG. 3 and FIG. 4, for example, the recording coils 70 are wound around the junction portion 67 between the main magnetic pole 60 and the write shield magnetic pole 62. In writing a signal to the magnetic disk 12, a recording current is supplied from the recording current supply circuit 91 to the recording coils 70, thus causing a magnetic flux to flow through the main magnetic pole 60 to generate a magnetic field. The current which is supplied from the recording current supply circuit 91 to the recording coils 70 is controlled by the main controller 90 of the HDD.

An electrically insulating layer 61 is located between the main magnetic pole 60 and the junction portion 67, so that the main magnetic pole 60 and the write shield magnetic pole 62 are electrically insulated from each other. The main magnetic pole 60 and the write shield magnetic pole 62 are electrically connected to first and second energization terminals 63, respectively, via respective wires. For example, the energization terminals 63 are provided on the trailing end 42b of the slider 42. The first and second energization terminals 63 are electrically connected to the STO current supply circuit 93 via wires 36 of the wiring members 28. This configures a current circuit which supplies electric current in series from the STO current supply circuit 93 through the main magnetic pole 60, the spin-torque oscillators 35a and 35b, and the write shield magnetic pole 62. The write shield magnetic pole 62 and the main magnetic pole 60 also function as electrodes used to perpendicularly energize the spin-torque oscillators 35a and 35b.

Furthermore, the energizing direction for electric current supplied by the STO current supply circuit 93 is switched by the switching circuit 98 between a forward direction (referred to hereinafter as the first direction) and a backward direction (referred to hereinafter as the second direction) under the control of the main controller 90. In other words, the STO current supply circuit 93 is able to select first direction energization, which performs energization in the order of the main magnetic pole 60, the spin-torque oscillators 35a and 35b, and the write shield magnetic pole 62, and second direction energization, which performs energization in the order of the write shield magnetic pole 62, the spin-torque oscillators 35a and 35b, and the main magnetic pole 60. Selecting the energizing direction enables selectively causing any one of the first spin-torque oscillator 35a and the second spin-torque oscillator 35b to perform an oscillating operation.

Next, each spin-torque oscillator is described in detail. As illustrated in FIG. 5, the first spin-torque oscillator 35a and the second spin-torque oscillator 35b are arranged side by side in the write gap WG between the fore-end portion 60a of the main magnetic pole 60 and the write shield magnetic pole 62. The first spin-torque oscillator 35a is located at an edge portion on one end side along the track width directions CW of the main magnetic pole 60, and a part thereof extends along the track width directions CW beyond the edge on one end side of the main magnetic pole 60. The second spin-torque oscillator 35b is located at an edge portion on the other end side along the track width directions CW of the main magnetic pole 60, and a part thereof extends along the track width directions CW beyond the edge on the other end side of the main magnetic pole 60. In the track width directions CW, the first spin-torque oscillator 35a and the second spin-torque oscillator 35b are arranged across an interval from each other along the track width directions CW. A space between the first spin-torque oscillator 35a and the second spin-torque oscillator 35b is filled with an insulating layer IL or an insulating material (e.g., protective insulating film 53).

The first spin-torque oscillator 35a includes a spin polarization layer 31a, which is made from a magnetic metal formed on the main magnetic pole 60, and a first conductive layer 32a, a magnetic flux control layer 33a made from a magnetic metal, and a second conductive layer 34a electrically connecting the magnetic flux control layer 33a and the write shield magnetic pole 62, which are sequentially stacked in layers on the spin polarization layer 31a. In this way, a plurality of layers 31a to 34a configuring the first spin-torque oscillator 35a is stacked in layers in order from the main magnetic pole 60 toward the write shield magnetic pole 62. When being energized in a direction from the main magnetic pole 60 toward the write shield magnetic pole 62, the first spin-torque oscillator 35a performs an oscillating operation, thus generating a spin torque. When being energized with a current flowing in the backward direction, the first spin-torque oscillator 35a does not substantially generate a spin torque. Furthermore, the spin polarization layer 31a may be omitted, and a configuration in which the first conductive layer 32a is directly formed on the main magnetic pole 60 may be employed.

The second spin-torque oscillator 35b includes a spin polarization layer 31b, which is made from a magnetic metal formed on the write shield magnetic pole 62, and a first conductive layer 32b, a magnetic flux control layer 33b made from a magnetic metal, and a second conductive layer 34b electrically connecting the magnetic flux control layer 33b and the main magnetic pole 60, which are sequentially stacked in layers on the spin polarization layer 31b. In this way, a plurality of layers 31b to 34b configuring the second spin-torque oscillator 35b is stacked in layers in the sequence reverse to that of the plurality of layers of the first spin-torque oscillator 35a, in other words, is stacked in layers in order from the write shield magnetic pole 62 toward the main magnetic pole 60. With this, when being energized in a direction from the write shield magnetic pole 62 toward the main magnetic pole 60, the second spin-torque oscillator 35b performs an oscillating operation, thus generating a spin torque. When being energized with a current flowing in the reverse direction, the second spin-torque oscillator 35b does not substantially generate a spin torque. Furthermore, the spin polarization layer 31b may be omitted, and a configuration in which the first conductive layer 32b is directly formed on the write shield magnetic pole 62 may be employed.

As an example, each of the spin polarization layers 31a and 31b is formed from a magnetic metal including at least one selected from among iron (Fe), cobalt (Co), and nickel (Ni). Each of the first conductive layers 32a and 32b is formed from a metallic layer including at least one selected from among copper (Cu), gold (Au), silver (Ag), aluminum (Al), iridium (Ir), and an NiAl alloy. Each of the magnetic flux control layers 33a and 33b is formed from a magnetic metal including at least one selected from among Fe, Co, and Ni. It is favorable that each of the second conductive layers 34a and 34b is formed from a metallic layer including at least one selected from among tantalum (Ta), ruthenium (Ru), platinum (Pt), tungsten (W), and molybdenum (Mo).

According to the HDD 10 including the magnetic heads 16 configured as described above, at the time of recording, the recording current supply circuit 91 of the head amplifier IC 30 energizes the recording coils 70 with a recording current according to a recording signal and recording pattern generated by the R/W channel 94. With this, the recording coils 70 excite the main magnetic pole 60, thus causing the main magnetic pole to generate a recording magnetic field. The highly concentrated magnetic field emitted from the fore-end portion 60a of the main magnetic pole 60 flows to the surface of the magnetic disk 12 and locally magnetizes the soft magnetic layer 102 of the magnetic disk 12. Subsequently, the magnetic field travels through the soft magnetic layer 102, and then flows back to the write shield magnetic pole 62, where the field is sufficiently spread out and weak so that it does not affect the previously stored data on the magnetic disk 102.

The STO current supply circuit 93 applies voltages to the main magnetic pole 60 and the write shield magnetic pole 62 under the control of the MPU 97, thus performing energization in series with a drive current through the wires 36, the energization terminals 63, the main magnetic pole 60, the first and second spin-torque oscillators 35a and 35b, and the write shield magnetic pole 62. Moreover, the STO current supply circuit 93 is caused by the switching circuit 98 to switch the energizing direction of the drive current from the first direction to the second direction under the control of the MPU 97, thus performing energization in series with a drive current through the wires 36, the energization terminals 63, the write shield magnetic pole 62, the first and second spin-torque oscillators 35a and 35b, and the main magnetic pole 60.

In other words, the STO current supply circuit 93 performs energization with a drive current in film thickness directions perpendicular to the film surfaces of the first and second spin-torque oscillators 35a and 35b along the first direction or the reverse, second, direction.

Performing energization in the first direction causes magnetization of the magnetic flux control layer 33a of the first spin-torque oscillator 35a to rotate, thus generating a spin torque. Performing energization in the second direction causes magnetization of the magnetic flux control layer 33b of the second spin-torque oscillator 35b to rotate, thus generating a spin torque. The spin torque generated from the first or second spin-torque oscillator 35a or 35b is turned in a direction opposite to the direction of a gap magnetic field occurring between the main magnetic pole 60 and the write shield magnetic pole 62. Accordingly, the spin torque functions in such a way as to reduce a magnetic flux flowing directly from the main magnetic pole 60 to the write shield magnetic pole 62. As a result, the amount of magnetic flux passing from the main magnetic pole 60 to the magnetic recording layer 103 of the magnetic disk 12 increases. When, in such a state, a recording magnetic field is applied from the recording head 58 to the magnetic recording layer 103, intended data is written into the magnetic recording layer 103.

Figure 6:
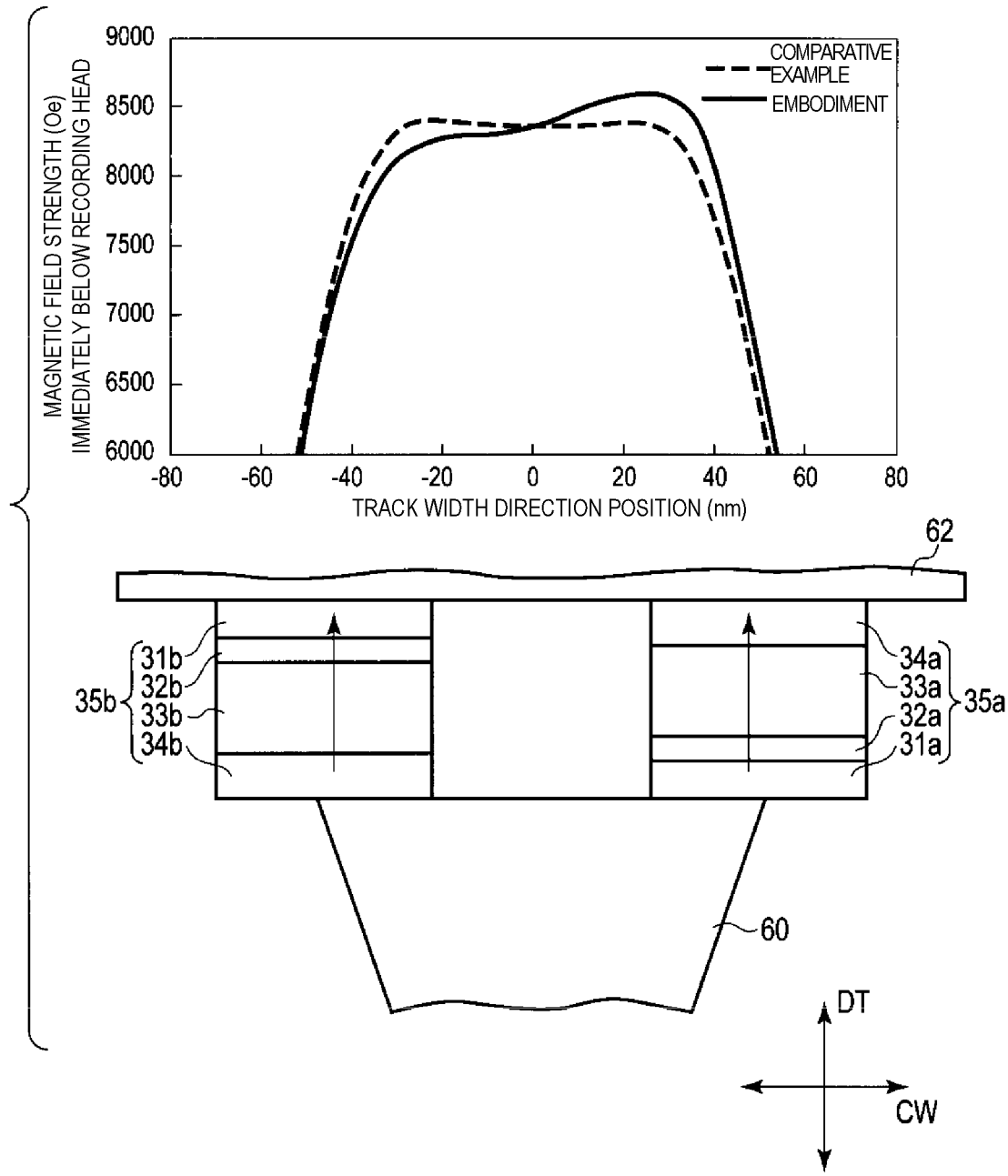
FIG. 6 is a diagram illustrating a relationship between a track width direction position of the recording head and a magnetic field strength.

FIG. 6 illustrates, for comparison, an off-track direction profile of a recording magnetic field distribution obtained when the recording head 58 configured as described above is used and an off-track direction profile of a recording magnetic field distribution obtained when a typical recording head with side shields employed as a comparative example is used. The position represented by "track width direction position=0" is the center position in the track width direction of the main magnetic pole 60 of the recording head. In FIG. 6, a dashed line is obtained by plotting maximum magnetic fields at various off-track direction points in a head magnetic field distribution occurring from immediately below the recording head employed as the comparative example. A solid line is obtained by plotting maximum magnetic fields at various off-track direction points in a head magnetic field distribution occurring from immediately below the recording head 58 according to the present embodiment.

In the illustrated example, a drive current is applied in the first direction, which causes the first spin-torque oscillator 35a to oscillate. In other words, energization with a drive current is performed from the STO current supply circuit 93 through the energization terminals 63, the main magnetic pole 60, the first spin-torque oscillator 35a, and the write shield magnetic pole 62. When energization is performed in the first direction, the second spin-torque oscillator 35b does not substantially generate a spin torque.

As can be seen from the solid-line characteristic line, in the recording head 58 according to the present embodiment, the magnetic field strength in the vicinity of the track width direction plus side (side of first spin-torque oscillator 35a) is improved as compared with the comparative example, and the magnetic field strength is increased by about 300 oersted (Oe) in the vicinity of +30 nm in the track width direction. On the other hand, the magnetic field strength in the vicinity of the track width direction minus side (side of second spin-torque oscillator 35b) is worsening as compared with the comparative example, and the magnetic field strength is decreased by about 200 Oe in the vicinity of −30 nm in the track width direction.

As described above, in a case where energization is performed in the first direction from the energization terminals 63 through the main magnetic pole 60, the first spin-torque oscillator 35a, and the write shield magnetic pole 62, a spin torque from the main magnetic pole 60 acts on the magnetic flux control layer 33a of the first spin-torque oscillator 35a, so that the direction of magnetization of the magnetic flux control layer 33a is turned to the direction opposite to the direction of a magnetic field (also referred to as gap magnetic field) occurring between the main magnetic pole 60 and the write shield magnetic pole 62. Accordingly, the magnetic flux control layer 33a functions in such a way as to reduce a magnetic flux which flows directly from the main magnetic pole 60 to the write shield magnetic pole 62. As a result, the amount of magnetic flux passing from the main magnetic pole 60 toward the magnetic recording layer 103 of the magnetic disk 12 increases.

In a case where energization with a drive current is performed in the first direction, no spin torque acts on the magnetic flux control layer 33b of the second spin-torque oscillator 35b. Accordingly, a magnetic flux which flows directly from the main magnetic pole 60 to the write shield magnetic pole 62 concentrates on the magnetic flux control layer 33b. As a result, the amount of magnetic flux passing from the main magnetic pole 60 toward the magnetic recording layer 103 of the magnetic disk 12 decreases. With such an operation performed, the recording head 58 according to the present embodiment is able to obtain a recording magnetic field distribution indicated by a solid line in FIG. 6.

Furthermore, in a case where the energizing direction for the STO drive current has been switched to the second direction by the switching circuit 98, no spin torque acts on the magnetic flux control layer 33a of the first spin-torque oscillator 35a, and a spin torque acts on the magnetic flux control layer 33b of the second spin-torque oscillator 35b. As a result, a magnetic field distribution profile which is bilaterally symmetrical to the off-track direction profile of the recording magnetic field distribution indicated by a solid line in FIG. 6 is obtained.

The magnetic heads 16 according to the present embodiment can be effectively utilized in an HDD employing the shingled recording method. Switching the energizing direction for the STO drive current as appropriate enables selectively causing the first spin-torque oscillator 35a and the second spin-torque oscillator 35b to operate and improving the recording quality of an edge portion of the main magnetic pole 60 intended to be used for writing.

Figure 7:
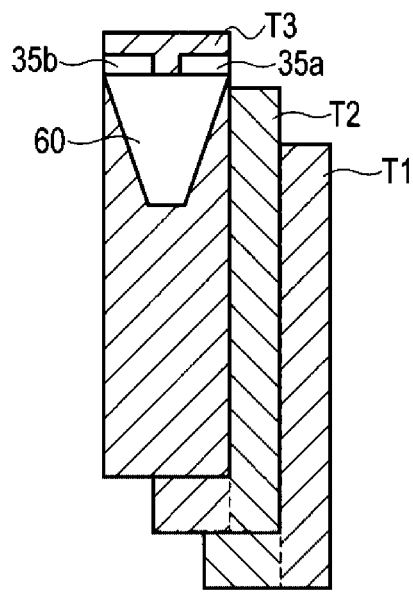
FIG. 7 is a diagram schematically illustrating an example of shingled recording.
Figure 8:
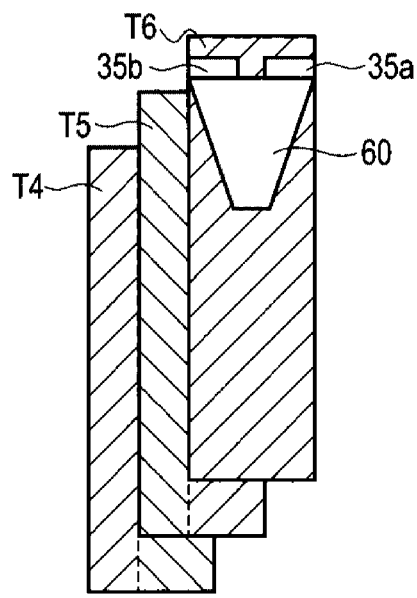
FIG. 8 is a diagram schematically illustrating an example of shingled recording.

Each of FIG. 7 and FIG. 8 schematically illustrates an example of shingled recording. As illustrated in FIG. 7, in the case of sequentially writing data tracks T1, T2, and T3 in an overlapping manner from the inner circumference (ID) of the magnetic disk 12 toward the outer circumference (OD) thereof, energization in the first direction causes the first spin-torque oscillator 35a of the recording head 58 to oscillate, which results in improvement of the magnetic field strength and effective magnetization of the magnetic disk in executing the shingled recording with the inner circumferential side edge of the main magnetic pole 60. As illustrated in FIG. 8, in the case of sequentially writing data tracks T4, T5, and T6 in an overlapping manner from the outer circumference (OD) of the magnetic disk 12 toward the inner circumference (ID) thereof, energization in the second direction causes the second spin-torque oscillator 35b of the recording head 58 to oscillate, which results in the effective magnetization in executing the shingled recording with use of the outer circumferential side edge of the main magnetic pole 60.

From those described above, according to the first embodiment, a magnetic recording head and a disk device including the same which are capable of attaining an improved recording quality can be provided. Moreover, selecting the direction in which to apply electric current to the film surface of the spin torque oscillator enables selecting an optimum overlap writing direction. Since each spin-torque oscillator has a configuration which does not include therein an electrode terminal for energization and an insulating layer, the overall layer thickness can be made thinner, and, as a result, an interval (i.e., write gap) between the main magnetic pole and the write shield magnetic pole can be made narrower. This enables narrowing the recording magnetization transition width and improving linear recording density.

Next, an HDD and a magnetic head according to another embodiment are described. Furthermore, in other embodiments described below, the same portions as those in the above-described first embodiment are assigned the respective same reference characters as those in the first embodiment, and the detailed description thereof may be omitted or simplified.

Second Embodiment

Figure 9:
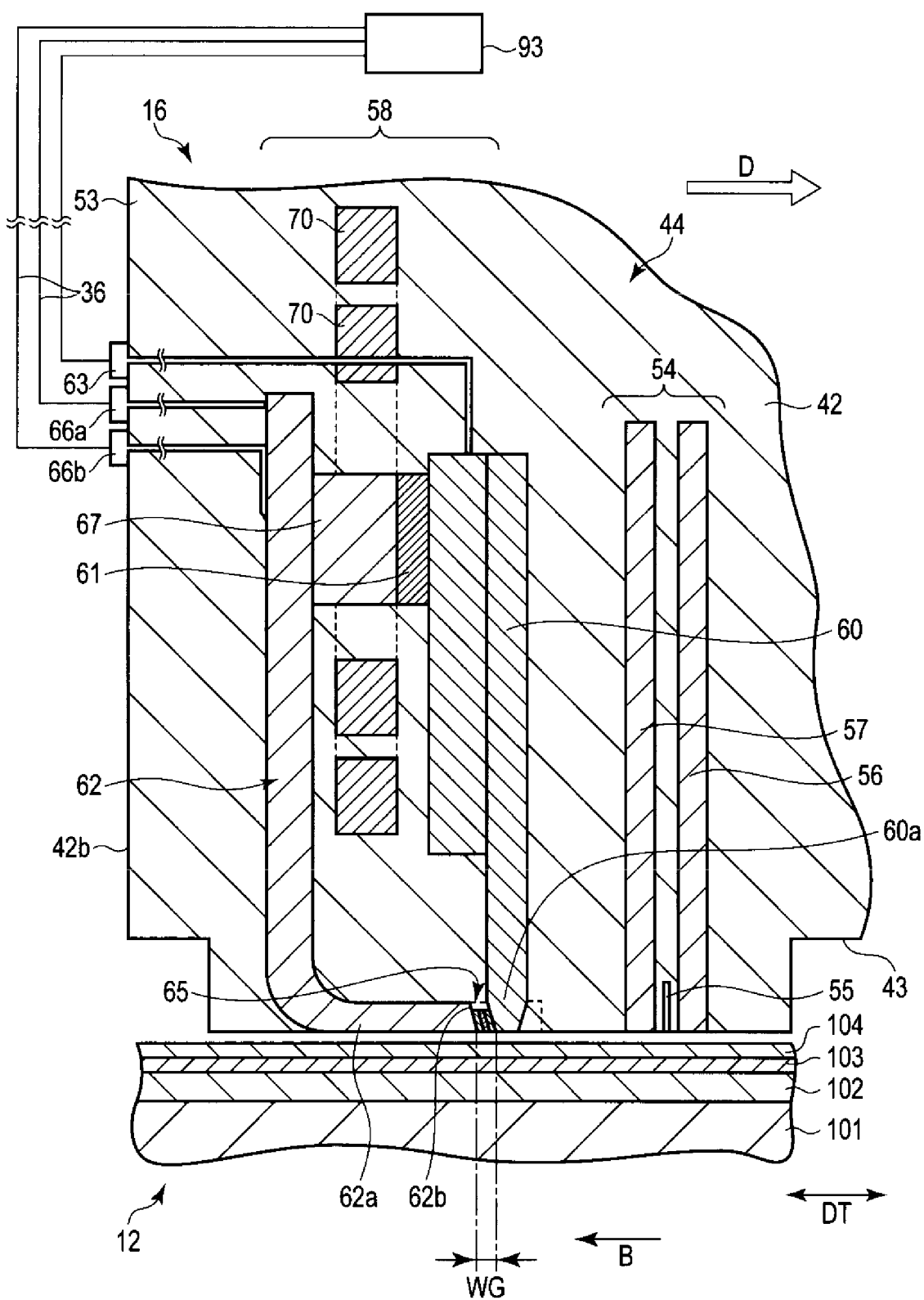
FIG. 9 is a sectional view illustrating, in an enlarged manner, a head portion of a magnetic head in an HDD according to a second embodiment.

A magnetic head of an HDD according to a second embodiment is described. FIG. 9 is a sectional view illustrating, in an enlarged manner, a head portion of the magnetic head in the HDD according to the second embodiment, FIG. 10 is a perspective view schematically illustrating a recording head of the magnetic head, and FIG. 11 is a plan view of the recording head as viewed from the ABS side.

Figure 10:
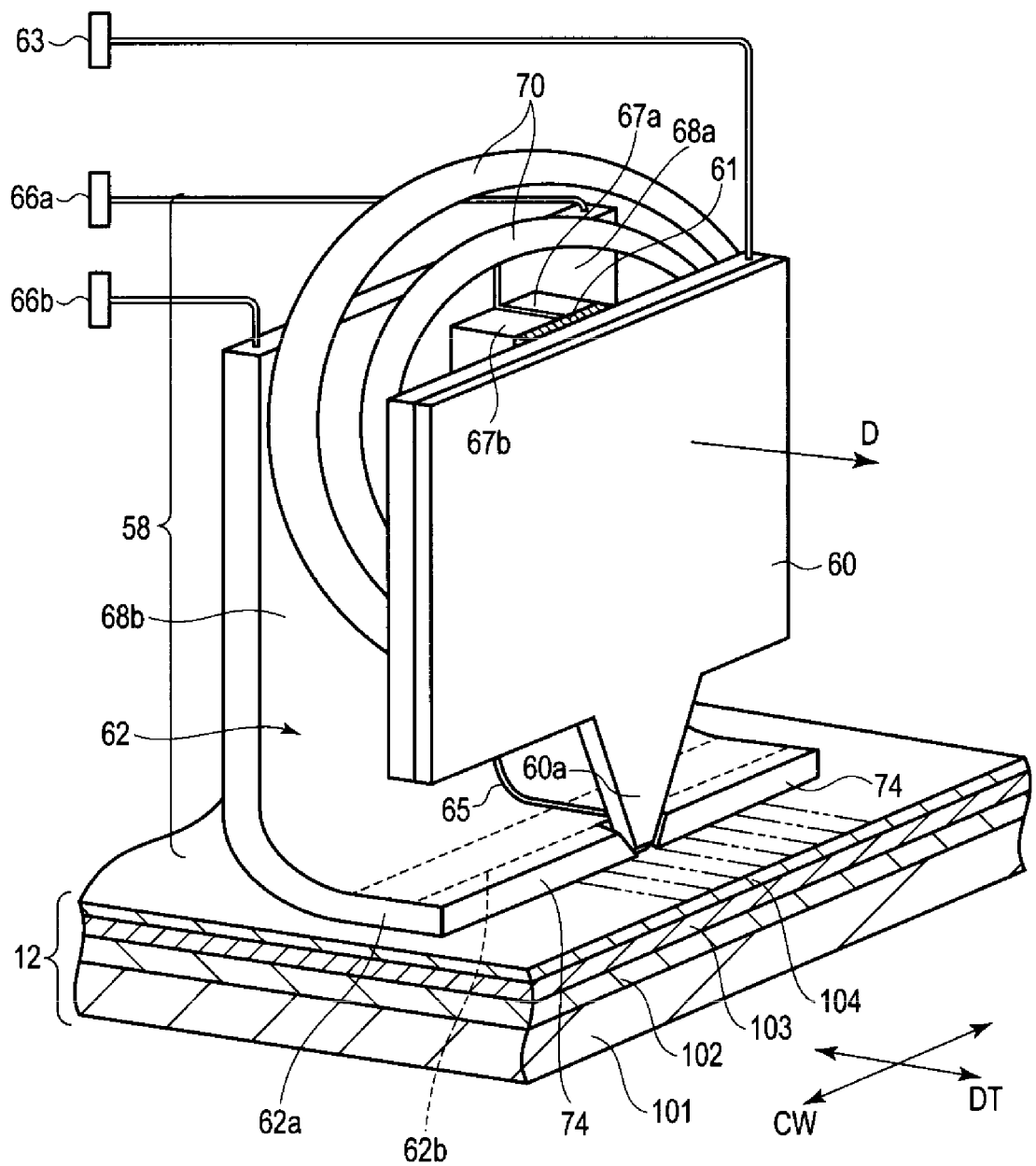
FIG. 10 is a perspective view schematically illustrating a recording head of the magnetic head according to the second embodiment.
Figure 11:
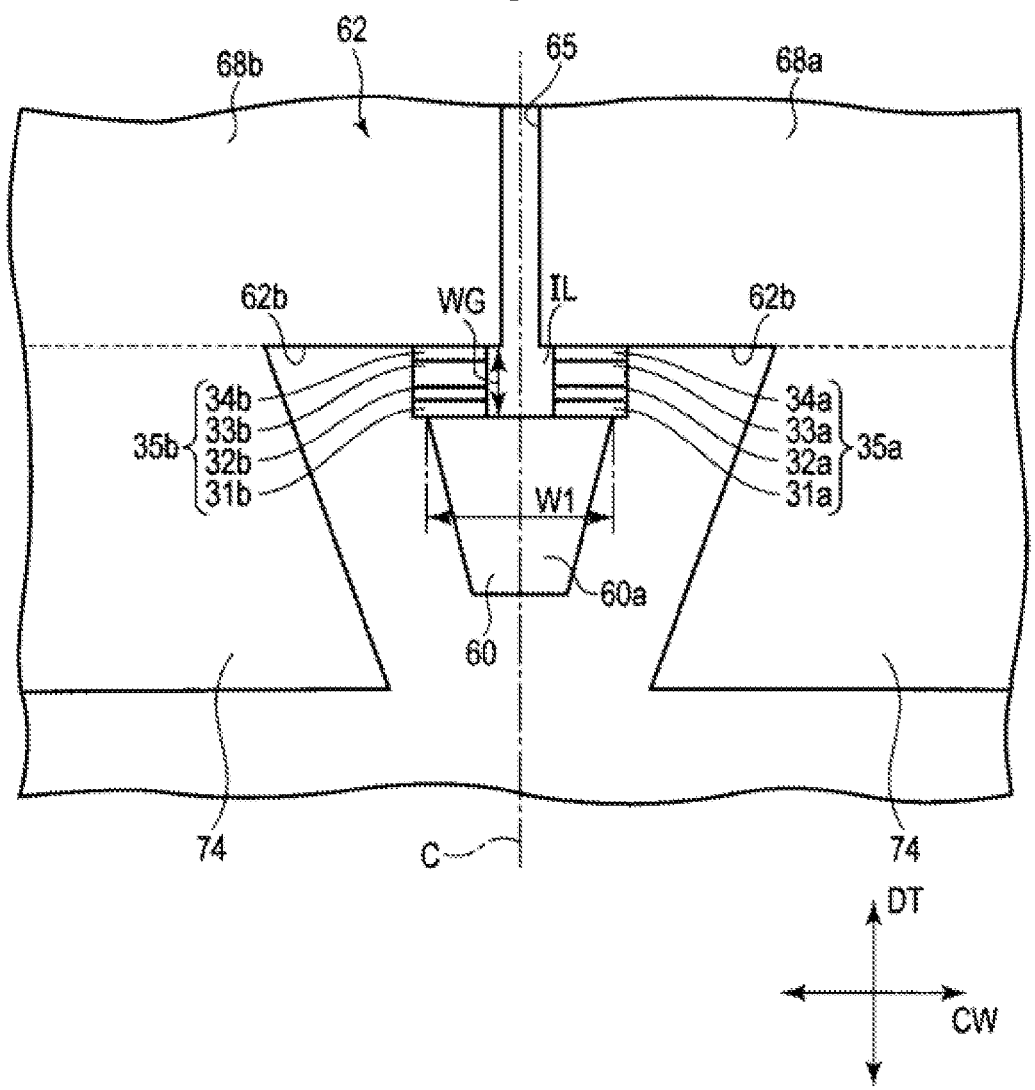
FIG. 11 is a plan view of the recording head of the magnetic head according to the second embodiment as viewed from the side of an ABS.

As illustrated in FIG. 10 and FIG. 11, according to the second embodiment, the write shield magnetic pole 62 of the recording head 58 is formed while being separated into a first shield magnetic pole 68a and a second shield magnetic pole 68b. As an example, the write shield magnetic pole 62 is separated by a slit 65 situated on the central axis C of the magnetic head 16 into two shield magnetic poles. The slit 65 is filled with an insulating layer (e.g., protective insulating film 53). With this, the first shield magnetic pole 68a and the second shield magnetic pole 68b are arranged adjacent to each other in an electrically insulated state.

Similarly, the junction portion 67 is separated by the slit 65 into two portions, i.e., a first junction portion 67a and a second junction portion 67b. The first junction portion 67a joins an upper portion of the first shield magnetic pole 68a and an upper portion of the main magnetic pole 60. The second junction portion 67b joins an upper portion of the second shield magnetic pole 68b and an upper portion of the main magnetic pole 60. An electrical insulating layer 61 is located between the first and second junction portions 67a and 67b and the main magnetic pole 60, so that the main magnetic pole 60 and the first and second shield magnetic poles 68a and 68b are electrically insulated from each other.

As illustrated FIG. 11, the first spin-torque oscillator 35a is provided between the main magnetic pole 60 and the first shield magnetic pole 68a in the write gap WG. The second spin-torque oscillator 35b is provided between the main magnetic pole 60 and the second shield magnetic pole 68b in the write gap WG. The first spin-torque oscillator 35a is located on one end side along the track width directions CW of the main magnetic pole 60, and a part thereof extends along the track width directions CW beyond the edge on one end side of the main magnetic pole 60. The second spin-torque oscillator 35*b* is located on the other end side along the track width directions CW of the main magnetic pole 60, and a part thereof extends along the track width directions CW beyond the edge on the other end side of the main magnetic pole 60. In the track width directions CW, the first spin-torque oscillator 35*a* and the second spin-torque oscillator 35*b* are arranged across an interval from each other along the track width directions CW. A space between the first spin-torque oscillator 35*a* and the second spin-torque oscillator 35*b* is filled with an insulating layer IL or an insulating material (e.g., protective insulating film 53).

The first spin-torque oscillator 35*a* includes a spin polarization layer 31*a*, which is made from a magnetic metal formed on the main magnetic pole 60, and a first conductive layer 32*a*, a magnetic flux control layer 33*a* made from a magnetic metal, and a second conductive layer 34*a* electrically connecting the magnetic flux control layer 33*a* and the first shield magnetic pole 68*a*, which are sequentially stacked in layers on the spin polarization layer 31*a*. In this way, a plurality of layers 31*a* to 34*a* configuring the first spin-torque oscillator 35*a* is stacked in layers in order from the main magnetic pole 60 toward the first shield magnetic pole 68*a*. When being energized in a direction from the main magnetic pole 60 toward the first shield magnetic pole 68*a*, the first spin-torque oscillator 35*a* performs an oscillating operation, thus generating a spin torque. The main magnetic pole 60 and the first shield magnetic pole 68*a* also function as electrodes used to perpendicularly energize the first spin-torque oscillator 35*a*.

The second spin-torque oscillator 35*b* includes a spin polarization layer 31*b*, which is made from a magnetic metal formed on the main magnetic pole 60, and a first conductive layer 32*b*, a magnetic flux control layer 33*b* made from a magnetic metal, and a second conductive layer 34*b* electrically connecting the magnetic flux control layer 33*b* and the second shield magnetic pole 68*b*, which are sequentially stacked in layers on the spin polarization layer 31*b*. In this way, a plurality of layers 31*b* to 34*b* configuring the second spin-torque oscillator 35*b* is stacked in layers in the same sequence as that of the plurality of layers of the first spin-torque oscillator 35*a*, in other words, is stacked in layers in order from the main magnetic pole 60 toward the second shield magnetic pole 68*b*. With this, when being energized in a direction from the main magnetic pole 60 toward the second shield magnetic pole 68*b*, the second spin-torque oscillator 35*b* performs an oscillating operation, thus generating a spin torque. The main magnetic pole 60 and the second shield magnetic pole 68*b* also function as electrodes used to perpendicularly energize the second spin-torque oscillator 35*b*.

As an example, each of the spin polarization layers 31*a* and 31*b* is formed from a magnetic metal including at least one selected from among Fe, Co, and Ni. Each of the first conductive layers 32*a* and 32*b* is formed from a metallic layer including at least one selected from among Cu, Au, Ag, Al, Ir, and an NiAl alloy. Each of the magnetic flux control layers 33*a* and 33*b* is formed from a magnetic metal including at least one selected from among Fe, Co, and Ni. It is favorable that each of the second conductive layers 34*a* and 34*b* is formed from a metallic layer including at least one selected from among Ta, Ru, Pt, W, and Mo.

As illustrated in FIG. 9 and FIG. 10, the main magnetic pole 60 is electrically connected to a first energization terminal 63 via a wire. The first shield magnetic pole 68*a* and the second shield magnetic pole 68*b* are electrically connected to a second energization terminal 66*a* and a third energization terminal 66*b* separately via respective wires. The first to third energization terminals 63, 66*a*, and 66*b* are provided on the trailing end 42*b* of the slider 42. The first to third energization terminals 63, 66*a*, and 66*b* are electrically connected to the STO current supply circuit 93 via respective wires 36 of the via wiring members 28. This configures a first current circuit which supplies electric current in series from the STO current supply circuit 93 through the main magnetic pole 60, the first spin-torque oscillator 35*a*, and the first shield magnetic pole 68*a* and a second current circuit which supplies electric current in series from the STO current supply circuit 93 through the main magnetic pole 60, the second spin-torque oscillator 35*b*, and the second shield magnetic pole 68*b*. With this, switching current circuits via the switching circuit 98 enables the STO current supply circuit to selectively supply a drive current to the first spin-torque oscillator 35*a* and the second spin-torque oscillator 35*b*. Furthermore, the energizing direction is assumed to be the first direction, which causes the first spin-torque oscillator 35*a* and the second spin-torque oscillator 35*b* to oscillate.

In the second embodiment, the other configurations of the magnetic head 16 and the HDD are the same as those of the magnetic head and the HDD in the above-described first embodiment.

According to the magnetic head 16 of the HDD according to the second embodiment configured as described above, a write shield magnetic pole is divided into two magnetic poles, which respectively configure two independent current circuits that energize the first spin-torque oscillator 35*a* and the second spin-torque oscillator 35*b*. This enables selectively driving the first and second spin-torque oscillators 35*a* and 35*b* as appropriate and efficiently performing magnetic recording with each edge portion of the main magnetic pole 60. For example, in the shingled recording method, in the case of sequentially writing data tracks in an overlapping manner from the inner circumference (ID) of the magnetic disk 12 toward the outer circumference (OD) thereof, energizing only the first spin-torque oscillator 35*a* of the recording head 58 to cause the first spin-torque oscillator 35*a* to perform an oscillating operation enables efficiently performing shingled recording. Moreover, in the shingled recording method, in the case of sequentially writing data tracks in an overlapping manner from the outer circumference (OD) of the magnetic disk 12 toward the inner circumference (ID) thereof, energizing only the second spin-torque oscillator 35*b* to cause the second spin-torque oscillator 35*b* to perform an oscillating operation enables efficiently performing shingled recording with use of the outer circumferential side edge of the main magnetic pole 60.

From those described above, according to the second embodiment, a magnetic recording head and a disk device including the same which are capable of attaining an improved recording quality can be provided. Moreover, according to the second embodiment, the first spin-torque oscillator and the second spin-torque oscillator are the same in film configuration and stacking sequence and are, therefore, able to be formed by a common manufacturing process. Accordingly, the formation of a magnetic head is facilitated and a reduction in manufacturing cost is made possible.

Furthermore, in the second embodiment, the wire and the first energization terminal 63 connected to the main magnetic pole 60 may be omitted, and a current circuit which energizes the first and second spin-torque oscillators 35*a* and 35*b* via the second and third energization terminals 66*a* and 66b may be configured. For example, energization may be performed from the second energization terminal 66a through the first shield magnetic pole 68a, the first spin-torque oscillator 35a, the main magnetic pole 60, the second spin-torque oscillator 35b, the second shield magnetic pole 68b, and the third energization terminal 66b in this order. In this case, a drive current flowing in the second direction from the first shield magnetic pole 68a toward the main magnetic pole 60 is supplied to the first spin-torque oscillator 35a, so that the first spin-torque oscillator 35a does not substantially generate a spin torque. On the other hand, a drive current flowing in the first direction from the main magnetic pole 60 toward the second shield magnetic pole 68b is supplied to the second spin-torque oscillator 35b, so that the second spin-torque oscillator 35b generates a spin torque.

When the energizing direction is switched by the switching circuit 98, energization is performed from the third energization terminal 66b through the second shield magnetic pole 68b, the second spin-torque oscillator 35b, the main magnetic pole 60, the first spin-torque oscillator 35a, the first shield magnetic pole 68a, and the second energization terminal 66a in this order. In this case, a drive current flowing in the second direction from the second shield magnetic pole 68b toward the main magnetic pole 60 is supplied to the second spin-torque oscillator 35b, so that the second spin-torque oscillator 35b does not substantially generate a spin torque. On the other hand, a drive current flowing in the first direction from the main magnetic pole 60 toward the first shield magnetic pole 68a is supplied to the first spin-torque oscillator 35a, so that the first spin-torque oscillator 35a generates a spin torque.

The present disclosure is not limited to just the above-described embodiments, but may be embodied with constituent elements thereof modified within a range not departing from the gist thereof in implementation phases. Moreover, various disclosures may be formed by an appropriate combination of a plurality of constituent elements disclosed in the above-described embodiments. For example, some constituent elements may be deleted from all of the constituent elements illustrated in the embodiments. Furthermore, constituent elements belonging to respective different embodiments may be combined as appropriate.

For example, materials used to configure a magnetic body and a non-magnetic body and shapes thereof are not limited to those in the embodiments, but may be changed as needed. For example, materials, shapes, and sizes of elements configuring a head portion of a magnetic head may be changed as needed. In a magnetic disk device, the numbers of magnetic disks and magnetic heads may be increased as needed, and various sizes of magnetic disks may be selected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
    a slider having an air bearing surface that faces a surface of a recording medium;
    a main magnetic pole including a fore-end portion that extends towards the air bearing surface and configured to generate recording magnetic fields in a first direction that is perpendicular to the surface of the recording medium;
    a write shield magnetic pole located across from the fore-end portion of the main magnetic pole to form a write gap that extends therebetween in a second direction and forming a magnetic core in conjunction with the main magnetic pole;
    a coil configured to excite a magnetic flux in the magnetic core;
    first and second spin-torque oscillators in the write gap and arranged along a third direction with a spacing therebetween, wherein the third direction is parallel to the surface of the recording medium and perpendicular to the first direction;
    an insulating layer inside the write gap between the first and second spin-torque oscillators; and
    a current circuit electrically connected to the first and second spin-torque oscillators via the main magnetic pole and the write shield magnetic pole and configured to supply current to oscillate one of the first and second spin-torque oscillators, wherein
    the first spin-torque oscillator includes
        a first conductive layer formed from a non-magnetic metal,
        a first magnetic flux control layer formed from a magnetic metal and provided on the first conductive layer, and
        a second conductive layer formed from a non-magnetic metal and provided between the first magnetic flux control layer and the write shield magnetic pole, and
    the second spin-torque oscillator includes
        a third conductive layer formed from a non-magnetic metal,
        a second magnetic flux control layer formed from a magnetic metal and provided on the third conductive layer, and
        a fourth conductive layer formed from a non-magnetic metal and provided between the second magnetic flux control layer and the fore-end portion of the main magnetic pole.

2. The magnetic recording head according to claim 1, wherein
    the first and third conductive layers are formed from a metallic layer including at least one selected from among Cu, Au, Ag, Al, Ir, and an NiAl alloy,
    the first and second magnetic flux control layers are formed from a magnetic metal including at least one selected from among Fe, Co, and Ni, and
    the second and fourth conductive layers are formed from a metallic layer including at least one selected from among Ta, Ru, Pt, W, and Mo.

3. The magnetic recording head according to claim 1, wherein
    the first spin-torque oscillator further includes a first spin polarization layer provided between the fore-end portion of the main magnetic pole and the first conductive layer,
    the second spin-torque oscillator further includes a second spin polarization layer provided between the write shield magnetic pole and the third conductive layer, and
    the first and second spin polarization layers are formed from a magnetic metal including at least one selected from among Fe, Co, and Ni.

4. The magnetic recording head according to claim 1, wherein
the current circuit includes a first energization terminal connected to the main magnetic pole and a second energization terminal connected to the write shield magnetic pole.

5. The magnetic recording head according to claim 1, wherein
the write shield magnetic pole includes first and second shield magnetic poles electrically insulated from each other,
the first and second spin-torque oscillators are provided between the fore-end portion of the main magnetic pole and the first and second shield magnetic poles, respectively.

6. The magnetic recording head according to claim 5, wherein
the current circuit includes
a first energization terminal connected to the main magnetic pole,
a second energization terminal connected to the first shield magnetic pole,
a third energization terminal connected to the second shield magnetic pole,
a first current circuit configured to energize the main magnetic pole, the first spin-torque oscillator, and then the first shield magnetic pole, and
a second current circuit configured to energize the main magnetic pole, the second spin-torque oscillator, and then the second shield magnetic pole.

7. The magnetic recording head according to claim 5, wherein
the current circuit includes first and second energization terminals connected to the first and second shield magnetic poles such that current passes through the first energization terminal, the first shield magnetic pole, the first spin-torque oscillator, the main magnetic pole, the second spin-torque oscillator, the second shield magnetic pole, and then the second energization terminal.

8. The magnetic recording head according to claim 5, wherein
the first and second shield magnetic poles are separated by a slit on a central axis of the magnetic recording head.

9. A magnetic recording head comprising:
a slider having an air bearing surface that faces a surface of a recording medium;
a main magnetic pole including a fore-end portion that extends towards the air bearing surface and configured to generate recording magnetic fields in a first direction that is perpendicular to the surface of the recording medium;
a write shield magnetic pole located across from the fore-end portion of the main magnetic pole to form a write gap that extends therebetween in a second direction and forming a magnetic core in conjunction with the main magnetic pole;
a coil configured to excite a magnetic flux in the magnetic core;
first and second spin-torque oscillators in the write gap and arranged along a third direction with a spacing therebetween, wherein the third direction is parallel to the surface of the recording medium and perpendicular to the first direction;
an insulating layer inside the write gap between the first and second spin-torque oscillators; and
a current circuit electrically connected to the first and second spin-torque oscillators via the main magnetic pole and the write shield magnetic pole and configured to supply current to oscillate one of the first and second spin-torque oscillators, wherein
the first spin-torque oscillator is configured to oscillate when current is supplied by the current circuit in the second direction, and
the second spin-torque oscillator is configured to oscillate when current is supplied in a fourth direction that is opposite to the second direction.

10. The magnetic recording head according to claim 9, wherein
the current supplied by the current circuit in the second direction energizes the main magnetic pole, the first spin-torque oscillator, and then the write shield magnetic pole, and
the current supplied by the current circuit in the fourth direction energizes the write shield magnetic pole, the second spin-torque oscillator, and then the main magnetic pole.

11. A disk device comprising:
a rotatable disk-shaped recording medium having a magnetic recording layer; and
a magnetic recording head configured to record information with respect to the magnetic recording layer and comprising:
a slider having an air bearing surface that faces a surface of a recording medium;
a main magnetic pole including a fore-end portion that extends towards the air bearing surface and configured to generate recording magnetic fields in a first direction that is perpendicular to the surface of the recording medium;
a write shield magnetic pole located across from the fore-end portion of the main magnetic pole to form a write gap that extends therebetween in a second direction and forming a magnetic core in conjunction with the main magnetic pole;
a coil configured to excite a magnetic flux in the magnetic core;
first and second spin-torque oscillators in the write gap and arranged along a third direction with a spacing therebetween, wherein the third direction is parallel to the surface of the recording medium and perpendicular to the first direction;
an insulating layer inside the write gap between the first and second spin-torque oscillators; and
a current circuit electrically connected to the first and second spin-torque oscillators via the main magnetic pole and the write shield magnetic pole and configured to supply current to oscillate one of the first and second spin-torque oscillators, wherein
the first spin-torque oscillator includes
a first conductive layer formed from a non-magnetic metal,
a first magnetic flux control layer formed from a magnetic metal and provided on the first conductive layer, and
a second conductive layer formed from a non-magnetic metal and provided between the first magnetic flux control layer and the write shield magnetic pole, and
the second spin-torque oscillator includes
a third conductive layer formed from a non-magnetic metal,
a second magnetic flux control layer formed from a magnetic metal and provided on the third conductive layer, and a fourth conductive layer formed from a non-magnetic metal and provided between the second magnetic flux control layer and the fore-end portion of the main magnetic pole.

12. The disk device according to claim 11, further comprising:
a current supply circuit configured to supply current to the current circuit; and
a switching circuit configured to switch an energizing direction of the current supply circuit.

13. The disk device according to claim 11, wherein
the first spin-torque oscillator is configured to oscillate when current is supplied by the current circuit in the second direction, and
the second spin-torque oscillator is configured to oscillate when current is supplied in a fourth direction that is opposite to the second direction.

14. The disk device according to claim 11, wherein
the write shield magnetic pole includes first and second shield magnetic poles electrically insulated from each other, and
the first and second spin-torque oscillators are provided between the fore-end portion of the main magnetic pole and the first and second shield magnetic poles, respectively.

* * * * *